Figure 1:
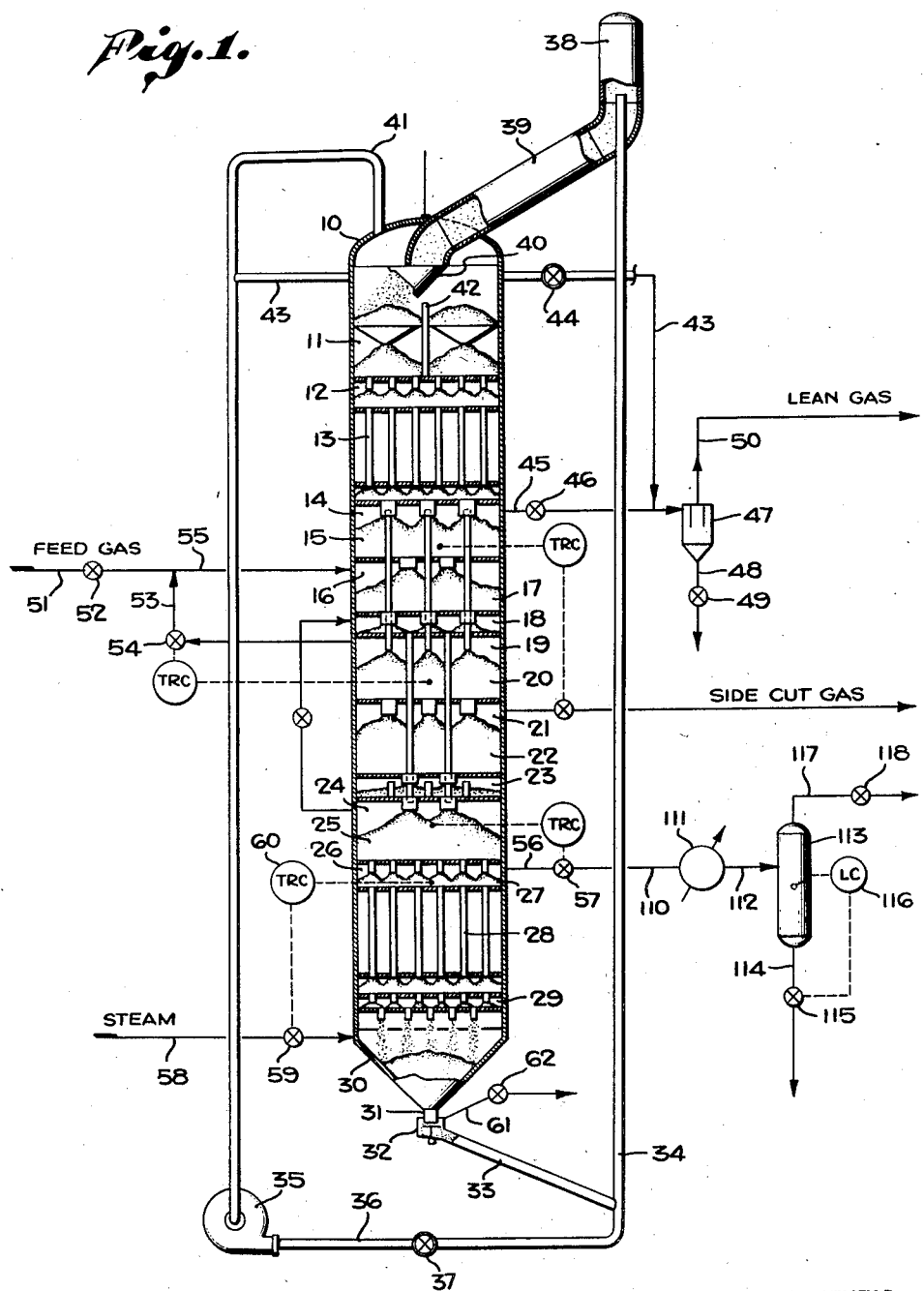

Aug. 22, 1950 C. H. O. BERG 2,519,874
ADSORPTION PROCESS AND APPARATUS
Filed May 29, 1947 2 Sheets-Sheet 2

INVENTOR.
Clyde H. O. Berg
BY
Ross J. Garofalo
ATTORNEY

Patented Aug. 22, 1950

2,519,874

UNITED STATES PATENT OFFICE 2,519,874

ADSORPTION PROCESS AND APPARATUS

Clyde H. O. Berg, Long Beach, Calif., assignor to Union Oil Company of California, Los Angeles, Calif., a corporation of California Application May 29, 1947, Serial No. 751,320

30 Claims. (Cl. 183—4.2)

This invention relates to a process and apparatus for the continuous separation of normally gaseous mixtures by selective adsorption of certain constituents of such mixtures on solid granular adsorbents and further relates to a method of control of such a process. The invention applies particularly to the separation of said gaseous mixtures by selective adsorption on granular charcoal into a plurality of fractions including a heart cut of extreme purity.

The separation of a light gaseous mixture into its constituent parts by the process of selective adsorption offers may advantages over the conventional separation processes of distillation, extraction, etc. In applying the processes of distillation or extraction to the separation of gaseous mixtures containing constituents of relatively low molecular weight, elevated pressures are required together with abnormally low temperatures to condense the gas into a liquid so that it may be separated by these processes. For example, in the preparation of pure ethylene by fractional distillation of ethylene-bearing stocks, a fractionator pressure of 385 pounds per square inch and a reflux temperature of −5° F. are required. In the preparation of pure methane by a similar process a pressure between 500 and 600 pounds per square inch and a reflux temperature of about −150° F. are required. The compression and refrigeration of light gaseous mixtures to permit separation by distillation or extraction are expensive operations and consequently large quantities of gaseous mixtures containing these and other light compounds are often wasted rather than to perform expensive recovery operations.

The conventional process of gas absorption in liquid absorbents has disadvantages which often render it inapplicable to the separation of light gaseous mixtures because generally the gases of low molecular weight are less soluble in the absorbing medium in absorbing compounds of the same class having higher molecular weights. Thus, high pressures of operation are also required in absorption processes in order to obtain an appreciable concentration of the light gaseous compound in the absorbing medium and to avoid circulation of large quantities of the absorbing medium through the system.

I have previously proposed a method for the separation of gaseous mixtures containing constituents which are difficultly liquefiable because of low critical temperatures and constituents which are not readily soluble in commonly used solvents. By this method such gaseous mixtures may be conveniently and economically separated at moderate temperatures and pressures and involves the application of selective adsorption and desorption on solid granular adsorbents.

In general, my previously proposed process of separating gaseous mixtures by continuous selective adsorption on a granular solid adsorbent involves the steps of counter-currently contacting the gaseous mixture with a moving bed of the adsorbent thereby adsorbing from the mixture those constituents which are more readily adsorbable and leaving as a substantially unadsorbed gas those constituents which are less readily adsorbable. In a moving bed operation the adsorbent, upon which certain of the gaseous constituents have been adsorbed, flows from an adsorption zone into a stripping or desorption zone wherein the adsorbent is heated and contacted with a stripping gas, such as steam, for example, to cause the adsorbed constituents to be liberated. The adsorbent, freed of adsorbed constituents, is subsequently cooled prior to repassage through the adsorption zone. In the previously proposed process of selective adsorption, a gaseous mixture may be divided into two separate fractions consisting of a rich gas containing the more readily adsorbable constituents having the higher molecular weight or critical temperature and a lean gas containing the less readily adsorbable constituents having the lower molecular weight or critical temperature. The rich gas is obtained by adsorption and subsequent desorption of the more readily adsorbable constituents and the lean gas is obtained by removal from the adsorption zone of the less readily adsorbable constituents as a substantially unadsorbed gas.

In a recently proposed improvement in the art of separation of gaseous mixtures by selective adsorption, an adsorption column has been provided which contains two or more rectification sections which permits the separation of the gaseous mixtures into more than two fractions. Such operations are made possible by the utilization of a refluxing step within these rectification sections permitting production not only of the lean and rich gases cited above, but also one or more intermediate fractions containing constituents which are of intermediate adsorbability.

Through modification of the previously proposed processes involving selective adsorption, virtually any gaseous mixture may be conveniently handled and separated at moderate temperatures and pressures into a plurality of fractions. In such gaseous mixtures containing a number of individual constituents, certain of these constituents tend to be more strongly absorbed by the adsorbent than others. In the case of the hydrocarbon gases, such as those containing less than about five carbon atoms per molecule and including both the saturated and the unsaturated gases, a good separation is easily attained using activated charcoal as the adsorbent which tends to absorb more strongly those hydrocarbons having the higher molecular weights. With the nonhydrocarbon gases there appears to be a correlation of increasing adsorbability with increasing critical temperatures of the individual nonhydrocarbon constituents of such a gaseous mixture. The process of selective adsorption, applied particularly in the fractionation of normally gaseous mixtures, is based upon this variation of adsorbability between individual gases with respect to a particular solid adsorbent. It is to the improvement of the selective adsorption process, especially as applied to the separation of a given gaseous mixture into a plurality of fractions which includes a heart cut or intermediate fraction containing constituents of intermediate adsorbability, that this invention is directed.

It is an object of my invention to provide an improvement in the art of selective adsorption whereby a normally gaseous mixture may be separated into a plurality of fractions including a heart cut fraction of the gaseous mixture in a single selective adsorption column thereby obviating the necessity of employing two selective adsorption columns to obtain an equivalent heart cut.

It is also an object of my invention to provide an improved selective adsorption process for the separation of normally gaseous hydrocarbon mixtures containing constituents which have about five carbon atoms per molecule or less into a plurality of fractions including a heart cut which consists essentially of a particular hydrocarbon constituent or constituents of extreme purity and at a high recovery.

It is a further object of my invention to provide a selective adsorption process of improved efficiency and which has an increased inherent operation simplicity.

It is a further object of my invention to provide a method of gas flow control in the selective adsorption process which permits an increased operation efficiency and results in an increased recovery of the individual constituents present in the gaseous mixture being separated.

A still further object of my invention is to provide an improved apparatus which is particularly adapted to accomplish the above-mentioned objects.

Other objects and advantages of my invention will become apparent to those skilled in the art as the description thereof proceeds.

Briefly, my invention comprises a process for the separation of gaseous mixtures which contain constituents having varying degrees of adsorbability with respect to a given granular solid adsorbent into a plurality of fractions or individual constituents thereof. The process of my invention comprises contacting the gaseous mixture with a moving bed of the solid granular adsorbent as herein more fully described in such a manner as to permit the production of a plurality of fractions of the gaseous mixture including an intermediate or heart cut fraction which contains constituents of the gaseous mixture of intermediate adsorbability. My invention also comprises a method by which efficient continuous operation of the selective adsorption process is achieved through automatic control of individual product and reflux gas flows involved in the improved selective adsorption process according to my invention. In addition, my invention comprises a selective adsorption apparatus which is particularly adapted to accomplish the separation of normally gaseous mixtures into a plurality of fractions of extreme purity.

By the process and apparatus of my invention as herein disclosed I have found it possible to obtain a heart cut of a gaseous mixture as a side cut gas of extreme purity containing constituents of intermediate adsorbability and which is virtually free of contaminating constituents of relatively higher and lower adsorbability. By the process of selective adsorption which I have previously described it is possible to resolve a normally gaseous mixture containing, for example, hydrogen together with saturated and unsaturated hydrocarbon gases containing about five carbon atoms per molecule or less into a first fraction which is a lean gas containing hydrogen and $C_1$ hydrocarbon as substantially unadsorbed constituents, and a second fraction containing the remainder of the hydrocarbon gases. By the process of my invention, as hereinafter more fully described, I am able to improve upon this type of separation by obtaining from such a gaseous mixture in one selective adsorption column or in one selective adsorption operation a heart cut fraction consisting predominantly of any one or a group of constituents of similar adsorbability in the gaseous mixture. The particular constituent or similar constituents in the heart cut which is obtained from a given gaseous mixture is a function of the various operation variables employed which include pressure, temperature, rate of adsorbent circulation, etc. For example, I may introduce such a gaseous mixture as described into a selective adsorption column through which is circulating a continuous downwardly moving bed of a solid granular adsorbent and obtain a lean gas from the adsorption zone which contains methane and any gases of lower critical temperature such as nitrogen, oxygen, or hydrogen, and the like, a heart cut or side cut fraction of $C_2$ hydrocarbons which include acetylene, ethylene, and/or ethane from an intermediate zone, and a rich gas product from the desorption zone containing the residual hydrocarbon gases including the $C_3$ and $C_4$ and higher hydrocarbons. Furthermore, by altering the particular conditions of the selective adsorption operation, a heart cut or intermediate fraction containing the $C_3$ hydrocarbons may be obtained in which case the lean gas would contain $C_2$ hydrocarbons, $C_1$ hydrocarbon and hydrogen, and a rich gas would contain $C_4$ or higher hydrocarbons. It is also possible to obtain more than one side cut or heart cut through the introduction of other intermediate zones which permits the production of, for example, a first heart cut which is rich in $C_2$ hydrocarbons and a second heart cut which is rich in $C_3$ hydrocarbons. In addition the process of my invention as previously described in brief may be applied with equal success to the separation of nonhydrocarbon gaseous mixtures or to the separation of mixtures of hydrocarbon and of the nonhydrocarbon gases.

Figure 2:
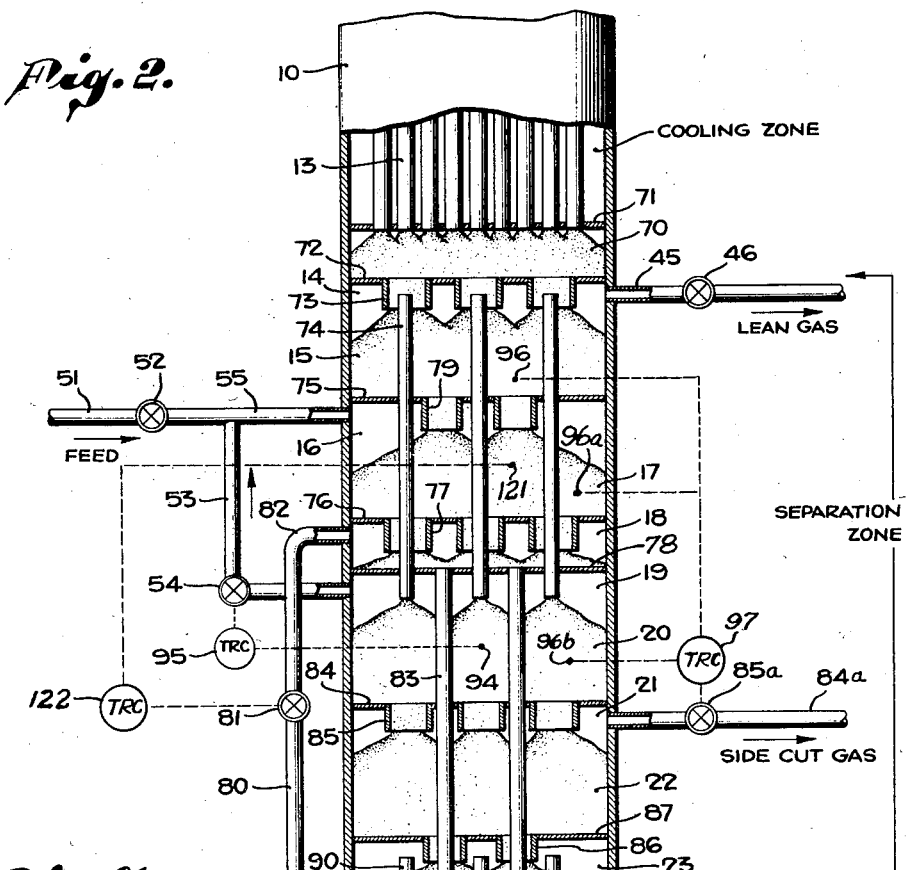
Figure 3:
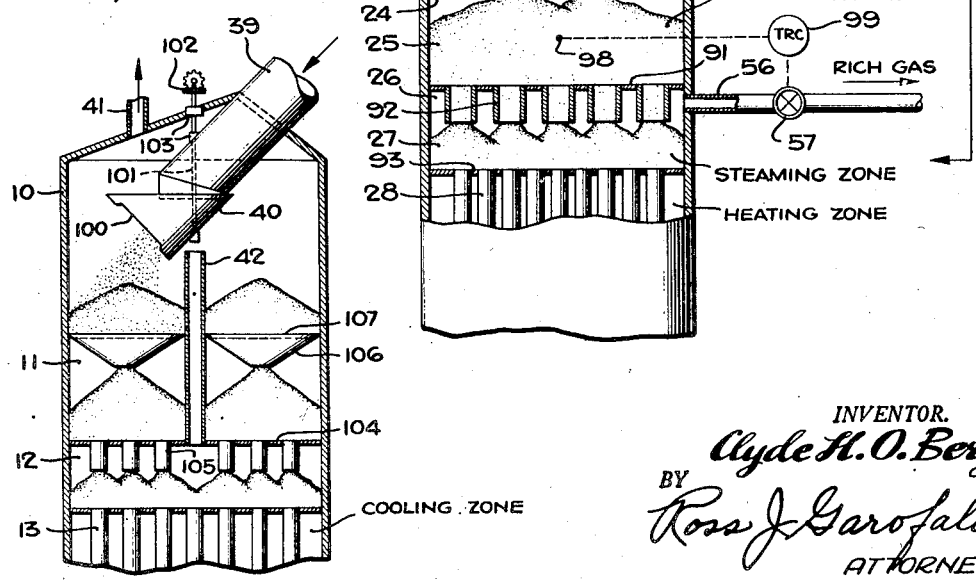

The process and apparatus of my invention may be more clearly understood with reference to the accompanying drawings in which:

Figure 1 is a diagrammatic cross section of the apparatus according to my invention which is particularly adapted to carry out the improved selective adsorption process herein disclosed, Figure 2 is a cross section of the separation zone of the improved selective adsorption apparatus shown in Figure 1, and Figure 3 is a cross section of the apparatus which permits an efficient distribution of the downwardly flowing adsorbent over the cross sectional area of the adsorption column.

Referring more particularly to Figure 1, the selective adsorption column 10 is provided at successively lower levels with an adsorbent distributing zone 11, a drying gas disengaging zone 12, an adsorbent cooling zone 13, a lean gas disengaging zone 14, a feed gas adsorption zone 15, a feed gas engaging zone 16, a primary rectification zone 17, a secondary reflux engaging zone 18, a primary reflux gas disengaging zone 19, a first side cut rectification zone 20, a side cut gas disengaging zone 21, a second side cut rectification zone 22, an adsorbent flow controller zone 23, a secondary reflux gas disengaging zone 24, a secondary rectification zone 25, a rich gas disengaging zone 26, a desorption zone which includes a steaming zone 27 and adsorbent heating zone 28, an adsorbent feeder zone 29, and bottom zone 30. Lean gas disengaging zone 14 and steaming zone 27 mark the upper and lower limits, respectively, of the separation zone of the selective adsorption apparatus as indicated in Figure 1. Feed gas adsorption zone 15 together with primary rectification zone 17 comprises the feed gas zone, first side cut rectification zone 20 and second side cut rectification zone 22 comprise the side cut gas zone, and secondary rectification zone 25 and steaming zone 27 comprise the rich gas zone, which are subdivisions of the separation zone.

A continuous downward flow of a lean solid granular adsorbent is maintained by gravity through adsorbent distributing zone 11 through drying gas disengaging zone 12 and through adsorbent cooling zone 13, from the bottom of which cooled lean adsorbent is discharged. The cooled lean adsorbent thus formed is divided in the feed gas zone into two fractions, the first fraction being introduced into the feed gas zone and the second into the side cut gas zone. The lean adsorbent continues to flow in separate streams through the feed gas zone and through the side cut gas zone and the adsorbent streams withdrawn from the feed and side cut gas zones are combined in adsorbent flow controller zone 23 and introduced into secondary rectification zone 25. The adsorbent subsequently flows through secondary rectification zone 25, through rich gas disengaging zone 26 and continues downwardly through desorption zone 28, through adsorbent feeder zone 29 into bottom zone 30. The adsorbent is removed from adsorption column 10 by means of sealing leg line 31 controlled by adsorbent valve 32 and is introduced into lift line 34 by means of transfer line 33.

The gaseous mixture to be separated is conveyed by means of line 51 controlled by valve 52 and may be combined with a primary reflux gas flowing through line 53 controlled by valve 54 to form a combined feed. The primary reflux gas contains constituents which are less readily adsorbable than those desired in a side cut gas and may be returned to any point within the feed gas zone. It is merely a mechanical and operation expedient to combine the primary reflux gas and gaseous mixture. The combined feed is subsequently introduced by means of line 55 into feed gas engaging zone 16. The combined feed thus introduced flows upwardly through feed gas adsorption zone 15 and is contacted with a moving bed of granular adsorbent. Herein the more readily adsorbable constituents of the combined feed are adsorbed by the adsorbent to form a rich adsorbent and a lean gas containing the less readily adsorbable constituents as a substantially unadsorbed gas. A portion of the lean gas passes upwardly through adsorbent cooling zone 13 countercurrent to the downwardly flowing adsorbent to serve as a drying gas to remove traces of adsorbed moisture from the adsorbent. The remaining portion of the lean gas is removed from lean gas disengaging zone 14 by means of line 45 as more fully described hereinafter. The lean gas which passes upward through the cooler is removed from the upper portion of adsorption column 10 by means of lean lift gas return line 41. Return line 41 conveys a portion of the lean gas downward to a junction with lift line 34 and transfer line 33 where it is introduced into lift line 34.

At the junction of transfer line 33 with the bottom of lift line 34 the adsorbent flowing through transfer line 33 is contacted with a lean lift gas forming an adsorbent-lean lift gas suspension which, under the positive pressure exerted by lift gas blower 35 through line 36 controlled by valve 37, is conveyed upwardly through lift line 34 and is introduced into impactless separator 38. Within separator 38, the adsorbent suspension is broken by a sudden decrease in flow velocity and the adsorbent and the suspending lean lift gas flow substantially independently downward through transfer line 39 into the top of adsorption tower 10. At the lower extremity of transfer line 39 is disposed movable means comprising funnel 40 which revolves and discharges the adsorbent uniformly with respect to particle size and quantity across the cross sectional area of the column by operating in conjunction with funnels disposed within distributing zone 11 as more fully described hereinafter.

The suspending gas, separated from the adsorbent suspension in impactless separator 38 and introduced together with the separated adsorbent by means of transfer line 39 into the top of adsorption tower 10, is removed therefrom by means of lift gas return line 41 and conveyed therethrough to lift gas blower 35 for reuse in the lift gas cycle. The lift gas utilized comprises a portion of the lean gas which is introduced into the lift gas cycle by passage upward through adsorbent cooling zone 13 by disengaging from the adsorbent in drying gas disengaging zone 12 and passing upwardly through tube 42 in adsorbent distribution zone 11. In order to avoid accumulations of the lean gas in the lift gas cycle, a portion of the lift gas is removed from lift gas return line 41 by means of line 43 controlled by valve 44 and is subsequently joined with the lean gas removed from lean gas disengaging zone 14 by means of line 45 controlled by valve 46. A pressure drop is maintained across valve 46 so that the gas removed by means of line 43 may be joined on the low pressure side of valve 46. The amount of gas flow through line 43 amounts, in general, to about 20 mol per cent of the total quantity of lean gas produced and is very nearly equivalent to the amount of lean gas which flows upwardly through adsorbent cooling zone 13 countercurrent to the downward flowing adsorbent wherein it serves to remove from the adsorbent traces of moisture adsorbed thereon. If allowed to accumulate, the moisture on the adsorbent would deleteriously effect the adsorbent flow characteristics. The lean gas removed from lean gas disengaging zone 14 combined with lean gas flowing through line 43 is introduced into separator 47 which serves to separate traces of adsorbent fines therefrom. These separated fines are removed from separator 47 by means of line 48 controlled by valve 49. The lean gas is removed from separator 47 by means of line 50 and removed from the system in substantially pure form as the lean gas product.

The adsorbent flows in individual streams through the feed gas zone and the side cut gas zone and are combined in adsorbent flow controller zone 24 to form a combined adsorbent as previously described. The combined adsorbent flows downwardly through secondary rectification zone 25 wherein the adsorbent is subjected to a rich gas reflux which serves to desorb therefrom any of the less readily adsorbable constituents which are undesired in the rich gas. The combined adsorbent, thus freed of less readily adsorbable constituents, flows downwardly through rich gas disengaging zone 26 into steaming zone 27. Herein, the combined adsorbent is contacted at low temperature with a countercurrent stripping gas serving to desorb from the adsorbent the major proportion of the adsorbed constituents in the absence of indirect heating thereby forming a rich gas and a lean adsorbent. A portion of the desorbed constituents is employed as the rich gas reflux in secondary rectification zone 25 and the remaining portion is removed from rich gas disengaging zone 26 by means of line 56 controlled by valve 57 and is introduced by means of line 110 into rich gas cooler 111. Herein the rich gas, which may contain small amounts of the stripping gas, is cooled to a temperature sufficient to substantially completely condense out the stripping gas as a liquid phase. The cooled mixture is introduced by means of line 112 into separator 113 wherein the condensate is separated from the cooled rich gas. The condensate is removed from separator 113 by means of line 114 controlled by valve 115 actuated by level controller 116. The cooled rich gas, virtually free of the stripping gas, is removed from separator 113 by means of line 116 controlled by valve 117 as the rich gas product. The lean adsorbent, substantially free of the more readily adsorbable constituents of the mixture but containing adsorbed quantities of the stripping gas, flows downwardly from steaming zone 27 into adsorbent heating zone 28 wherein it is subjected to indirect heating and contacted directly with further quantities of a stripping gas. Any residual amounts of the more readily adsorbable constituents desired in the rich gas are substantially desorbed from the adsorbent. The more readily adsorbable constituents thus desorbed in heating zone 28 move upwardly through the tubes of heating zone 28, through steaming zone 27, and are removed from rich gas disengaging zone 26 as part of the rich gas.

The indirect heating of the adsorbent in the tubes of heating zone 28 may be accomplished by circulating hot flue gases about the outside of the tubes. To avoid overheating, a control of flue gas temperature may be maintained by recirculating cooled flue gas which has passed through heating zone 28 with hot flue gases introduced thereinto. Wide variations of temperature may be realized by controlling the ratio of hot and cold flue gas circulated. Other means for supplying heat may be employed such as steam, hot gases, or hot organic vapors such as diphenyl, diphenyloxide, or mixtures thereof.

Suitable stripping gases which are applicable for use in desorption zone 28 are gases which are more readily adsorbable at adsorption temperatures, e. g., at relatively low temperatures such as below about 200° F. than are the more readily adsorbable constituents of the gaseous mixture being separated. It is also highly desirable that the stripping gas have a relatively flat temperature-adsorbability curve, i. e., that it be substantially unadsorbable at a temperature only slightly above the maximum temperature at which it is substantially completely adsorbed. The preferable stripping gas is steam in which case the condensate formed in rich gas cooler 111 would be water.

Many adsorbents have a tendency to adsorb water vapor or steam under certain temperature and pressure conditions in preference to other gaseous compounds. It is possible to operate the selective adsorption process so that there exists an internal recycle of stripping gas in the desorption zone, thus reducing the amount of stripping gas required for introduction through line 58 and the amount of stripping gas requiring separation from the rich gas leaving line 56 without sacrifice in the efficiency of the stripping. This is accomplished by proper control of both the minimum temperature in the steaming zone and the maximum temperature in the heating zone. If a substantial differential is maintained between these two temperatures, part of the stripping gas will tend to be adsorbed in the steaming zone and be carried into the heating zone by the adsorbent, there to be desorbed with part of the rich gas as described above and returned to the steaming zone, where it is again adsorbed and the cycle is repeated. An increase in the above temperature differential either by lowering the minimum temperature in the steaming zone or by increasing the maximum temperature in the heating zone, will increase the amount of internal recycle of stripping gas, and will also increase the amount of rich gas displaced from the adsorbent in the steaming zone by the preferential adsorption of the stripping gas. Preferably a temperature differential of at least about 100° F. should be maintained, with a temperature in the steaming zone sufficiently low to effect displacement of a major proportion of the rich gas in the steaming zone and thus minimize difficulties due to polymerization of the rich gas should that product gas contain polymerizable constituents, and a temperature in the heating zone sufficiently high to insure desorption of substantially all of the stripping gas. In the case of steam as the stripping gas, the optimum maximum temperature in the heating zone is approximately that given by the following equation:

$$T = 175 P^{0.191}$$

where T is the temperature in °F. and P the pressure in pounds per square inch absolute; and the minimum temperature in the steaming zone should desirably be below about 200° F., but above the dew point of the steam rich gas mixture. The minimum temperature is generally at least about 200° F. below the maximum temperature calculated from the relationship given above.

The desorption of the major proportion of the adsorbed gases from the adsorbent in the steaming zone is effected in the absence of indirect heating. One outstanding advantage in low temperature desorption effected in steaming zone 27 is marked reduction in the formation of hydrocarbon polymers from unsaturated hydrocarbon gases which accumulate on the adsorbent and decrease the adsorption capacity. The thus desorbed gases form the rich gas which is removed from rich gas disengaging zone 26 and the adsorbent containing adsorbed steam moves downwardly from steaming zone 27 and through heating zone 28 wherein it is indirectly heated to temperatures sufficiently high to cause desorption of the adsorbed steam. The thus desorbed steam leaves the adsorbent and moves upwardly again to repeat the internal steam cycle. The rich gas desorbed from the adsorbent in steaming zone 27 is substantially free from steam and only very small quantities of steam must be introduced as make-up into the desorption zone. This method of desorption operation permits large reductions in the steam consumed by the process which results in an increased operation economy. It should be emphasized that at no point in steaming zone 27 or desorption zone 28 is the adsorbent wet with water, but that the water present on the adsorbent is in the form of an adsorbed phase at a temperature about 20° F. above that which would normally permit formation of a condensate at the particular operation pressure, i. e., normally about 20° F. above the dew point of the gaseous mixture.

In order to minimize the loss of steam from the internal recycle previously described, the adsorbent must be discharged from the desorption zone in a substantially anhydrous condition. An anhydrous adsorbent may be discharged provided that the maximum temperature maintained in the bottom of heating zone 28 is above a certain minimum value which depends upon the particular adsorbent and the desorption operation pressure. When charcoal is employed as the adsorbent, the temperature at the discharge outlet should at least equal the temperature calculated from the following relation:

$$T = 175 P^{0.191}$$

where T is given in degrees Fahrenheit and the units of P are pounds per square inch absolute pressure as previously described.

When best conditions of operation are realized, a substantially anhydrous adsorbent is discharged from the desorption zone and a small amount of stripping steam or other suitable gas is added to effect a seal to prevent ingress of lean lift gas through transfer line 33 into the desorption zone as hereinafter more fully described.

It is sometimes of advantage when separating gaseous mixtures which contain $C_4$, $C_5$ and/or higher hydrocarbons to operate heating zone 28 under such conditions that a small amount of stripping steam is withdrawn with the rich gas. In such cases, steam in the amount of that withdrawn with the rich gas must be introduced to permit continuation of efficient desorption. Such added steam is introduced by means of line 58 controlled by valve 59 which is in turn actuated by a temperature control point situated within steaming zone 27. In this manner of operation, a portion of the steam stripping gas introduced by means of line 58 into bottom zone 30 passes upwardly through adsorbent feeder zone 29, enters the lower portion of heating zone 28, passes therethrough countercurrently to the downwardly flowing adsorbent, and contacts the adsorbent in the hottest portion of heating zone 28. The combination of an elevated temperature and the presence of stripping steam in the lower portion of heating zone 28 serves to insure the complete removal from the adsorbent of small amounts of the more readily adsorbable constituents such as for example $C_4$ and $C_5$ hydrocarbons to form a hot lean adsorbent.

A small portion of the steam thus introduced into bottom zone 30 moves downwardly therethrough concurrently with the hot lean adsorbent withdrawn from the desorption zone. This steam, which is largely unadsorbed, flows through sealing leg line 31 and is removed from the system near adsorbent valve 32 by means of line 61 controlled by valve 62. This flow of steam through sealing leg line 31 serves as a seal between the bottom of the selective adsorption tower 10 and the lower part of adsorbent lift line 34. A flow of the lean lift gas upward through transfer line 33, sealing leg line 31 and into bottom zone 30 which would contaminate the rich gas is thereby prevented. As a result of this steam seal, the small amount of lean lift gas which does flow upwardly through transfer line 37 and aids in removal of adsorbed steam from the adsorbent is removed from adsorbent valve 32 through line 61 together with the steam as previously described. This gas, comprising a mixture of the lean and stripping gases, is subsequently separated and the lean gas is joined with the lean gas product.

In Figure 2 is shown the vertical cross section of the separation zone, which includes zones 14 to 27, inclusive, of the selective adsorption apparatus according to my invention wherein like parts are indicated with the same reference numbers as in Figure 1.

The continuous downward flow of solid granular adsorbent which is maintained through selective adsorption column 10 as previously described flows through cooling zone 13 into adsorbent zone 70 which is formed between lower tube sheet 71 of cooling zone 13 and feed gas zone primary tray 72 of lean gas disengaging zone 14. Primary tray 72 is equipped with feed gas zone primary tubes 73 which are integrally attached to and extend downward therefrom. Introduced into the lower ends of primary tubes 73 and extending upwards thereinto for a distance equal to about one-half the length thereof are feed gas zone quaternary tubes 74. Positioning of the upper extremities of quaternary tubes 74 in primary tubes 73 is a mechanical expedient. Actually quaternary tubes 74 need only extend upward into feed gas adsorption zone 15 to a position within the moving adsorbent bed at which none of the more readily adsorbable constituents of the gaseous mixture which normally are removed with the rich gas are adsorbed on the adsorbent. Thus, the second fraction of adsorbent, which is introduced via quaternary tubes 74 into the side cut gas zone, as hereinafter more fully described, contains no adsorbed constituents which are more readily adsorbable than the constituents of intermediate adsorbability desired in the side cut or heart cut gas product. Feed gas zone quaternary tubes 74 extend downward completely through feed gas adsorption zone 15, through and are integrally attached to feed gas zone secondary tray 75, through feed gas engaging zone 16, through primary rectification zones 17, through feed gas zone tertiary tray 76, and concentrically through feed gas zone tertiary tubes 77 which are of approximately the same dimensions as primary tubes 73 and which are integrally attached to and extend downward from tertiary tray 76. Feed gas zone quaternary tubes 74 further extend through secondary reflux gas engaging zone 18, through and integrally attached to side cut gas zone primary tray 78 into primary reflux gas disengaging zone 19, and terminate therein a distance below side cut gas zone primary tray 78 which is about equal to the length of tertiary tubes 77 and tubes 73. Quaternary tubes 74 are designed to have relatively small diameters in comparison to the primary, secondary, and tertiary tubes so as to substantially prevent an upward flow of gas from the side cut gas zone to the feed gas zone and still permit a free and unimpeded downward flow of adsorbent.

The lean adsorbent is cooled in cooling zone 13 and is discharged therefrom into zone 70 and flows downward through primary tubes 73 attached to primary tray 72 and is divided in the feed gas zone into two individual and independent streams. The first of the two lean adsorbent streams flows downwardly through the annular space formed between primary tubes 73 and feed gas zone quaternary tubes 74 and flows into the feed gas zone which comprises feed gas adsorption zone 15 and primary rectification zone 17. The second lean adsorbent stream flows downwardly through feed gas zone quaternary tubes 74 through and independent of feed gas adsorption zone 15, primary rectification zone 17, and discharges into the side cut gas zone which comprises first side cut rectification zone 20 and second side cut rectification zone 22 and adsorbent flow controller zone 23. A portion of the lean gas which is normally withdrawn from lean gas disengaging section 14 through line 45 controlled by valve 46 flows upwardly through adsorbent zone 70 and subsequently flows upward through the tubes of cooling zone 13 serving therein to remove traces of moisture from the adsorbent and to saturate the adsorbent with the less readily adsorbable constituents contained in the lean gas. Thus, the adsorbent, which is discharged into adsorbent zone 70 and which subsequently flows in the first and second lean adsorbent streams previously described into the feed gas zone and the side cut gas zone, is saturated with the less readily adsorbable constituents present in the gaseous mixture being separated.

The first of the two lean adsorbent streams previously mentioned, which flows downwardly through the annular space between feed gas zone primary tubes 73 and feed gas zone quaternary tubes 74, flows downwardly through feed gas adsorption zone 15 countercurrent to the upwardly flowing combined feed introduced by means of line 55 into feed gas engaging zone 16. Feed gas engaging zone 16 is formed by feed gas zone secondary tray 75 and feed gas zone secondary tubes 79 which are integrally attached thereto and extend downward therefrom. The length of secondary tubes 79 is about equal to the length of primary tubes 73 and are arranged around feed gas zone quaternary tubes 74 in such a manner that a regular geometrical pattern of the secondary tubes and feed zone quaternary tubes attached to secondary tray 75 is formed. During the passage of the combined feed upwardly through feed gas adsorption zone 15, the more readily adsorbable constituents contained in the combined feed are adsorbed to form a rich adsorbent. The rich adsorbent passes from feed gas adsorption zone 15 through secondary tubes 79 and is discharged into primary rectification zone 17. The primary reflux, which is removed from primary reflux gas disengaging zone 19 by means of line 53 controlled by valve 54 and combined with the gaseous mixture to be separated to form the combined feed or return to any point in the feed gas zone as previously described, contains a rather high concentration of the less readily adsorbable constituents of the gaseous mixture together with a moderate concentration of the constituents of intermediate adsorbability. The latter constituents, that is, those of intermediate adsorbability, are adsorbed on the adsorbent in feed gas adsorption zone 15 leaving a substantially unadsorbed gas therein which comprises the less readily adsorbable constituents of the gaseous mixture. These constituents form a lean gas, a portion of which is removed as described from lean gas disengaging zone 14 as the lean gas product and the remaining portion forms an adsorbent drying gas which passes upwardly through cooling zone 13 as previously described.

A secondary reflux gas, which contains constituents of intermediate adsorbability together with perhaps a small amount of the more readily adsorbable constituents, is withdrawn from secondary reflux gas disengaging zone 24 by means of line 80 controlled by valve 81 and is introduced by means of line 82 into primary rectification zone 17 via secondary reflux gas engaging zone 18 formed by tertiary tray 76 and tertiary tubes 77 attached thereto. The secondary reflux gas engages with the downwardly flowing adsorbent in secondary reflux gas engaging zone 18, travels upwardly through the annular space formed between tertiary tubes 77 and feed gas zone quaternary tubes 74, and is introduced in primary rectification zone 17. Herein the downwardly flowing rich adsorbent formed in feed gas adsorption zone 15 is contacted by the secondary reflux gas thus introduced thereby causing the substantially complete desorption from the adsorbent of the less readily adsorbable constituents which are inevitably present. In turn, the more readily adsorbable constituents contained in the secondary reflux gas are preferentially adsorbed to form an enriched adsorbent. The enriched adsorbent is discharged from primary rectification zone 17 into secondary reflux gas engaging zone 18 saturated with the constituents of the gaseous mixture of intermediate adsorbability together with some of the more readily adsorbable constituents and is substantially free of the less readily adsorbable constituents. This enriched adsorbent flows downwardly from secondary reflux gas engaging zone 18 through side cut gas zone quaternary tubes 83 which pass independently through first side cut rectification zone 20, independently through second side cut gas rectification zone 22, and into adsorbent flow controller zone 23. The enriched adsorbent is joined in flow controller zone 23 with the second of the adsorbent flows which will subsequently be described. quaternary tubes 83 are designed to permit a free downward adsorbent flow and substantially prevent an upward flow of gas therethrough from secondary rectification zone 25 to primary rectification zone 17.

The second of the two adsorbent streams, of which the first has just been described, is introduced into first side cut rectification zone 20 by means of feed gas zone quaternary tubes 74 previously described. The lean adsorbent flowing through feed gas zone quarternary tubes 74, being withdrawn from adsorbent zone 70 as was the first of the two adsorbent streams, is saturated with the less readily adsorbable constituents of the gaseous mixture by direct contact in adsorbent zone 70 and the tubes of cooling zone 13 with a portion of the lean gas containing those constituents. Within first side cut gas rectification zone 20, the lean adsorbent flowing downwardly therethrough is contacted by a side cut gas reflux which consists substantially completely of pure constituents of intermediate adsorbability. These constituents are relatively more readily adsorbable than the constituents adsorbed upon the lean adsorbent introduced into side first cut gas rectification zone 20 and a preferential adsorption occurs. The less readily adsorbable constituents are thereby desorbed from the lean adsorbent to form a partially enriched adsorbent containing adsorbed constituents of intermediate adsorbability. The desorbed constituents move upwardly through first side cut rectification zone 20 countercurrent to the downwardly flowing lean adsorbent and are disengaged therefrom as the primary reflux gas previously described from primary reflux gas disengaging zone 19. The thus desorbed constituents are removed from primary reflux gas disengaging zone 19 and returned to the feed gas zone. The partially enriched adsorbent flowing downwardly through first side cut rectification zone 20 is saturated with constituents of intermediate adsorbability and is substantially free of the less readily adsorbable and the more readily adsorbable constituents. The partially enriched adsorbent is discharged from first side cut rectification zone 20 by passing through side cut gas zone secondary tray 84 and through side cut gas zone secondary tubes 85 integrally attached thereto which extend downward therefrom a short distance into second side cut rectification zone 22 thereby forming side cut gas disengaging zone 21. Secondary tubes 85, which are integrally attached to secondary tray 84 together with side cut gas zone quarternary tubes 83, are arranged in a regular geometrical pattern upon secondary tray 84. The partially enriched adsorbent discharged from first side cut rectification zone 20 is introduced into second side cut rectification zone 22 wherein it contacts a countercurrent stream of secondary reflux gas which is in essence an impure side cut gas containing a high concentration of the constituents of intermediate adsorbability and which also contains some of the more readily adsorbable constituents. Again, because of the preferential adsorption exhibited by adsorbents, the more readily adsorbable constituents present in the gas phase are adsorbed causing thereby a desorption of the constituents of intermediate adsorbability adsorbed thereon to form an enriched adsorbent. The thus desorbed constituents move upwardly into first side cut gas rectification zone 22 and a portion is disengaged from the adsorbent in side cut gas disengaging zone 21 as a purified side cut gas product by means of line 84a controlled by valve 85a. The remaining portion of the side cut gas flows upwardly into first side cut rectification zone 20 to act as reflux therein as described above. The side cut gas product contains an extremely high concentration of the constituents of intermediate adsorbability because of the manner in which the adsorbent is treated in the feed gas zone and the side cut gas zone. This treatment virtually completely eliminates from the adsorbent the presence of any constituents which are more readily adsorbable or less readily adsorbable than the constituents of intermediate adsorbability which are desired in the side cut gas product.

The enriched adsorbent formed in the second side cut rectification zone 22 moves downwardly therethrough and is discharged therefrom through the annular spaces formed between side cut gas zone quarternary tubes 83 and side cut gas zone tertiary tubes 86. The latter tubes are integrally attached to side cut gas zone tertiary tray 87 and arranged thereon in such a configuration as to be concentric with tubes 83. The enriched adsorbent thus discharged flows downwardly into adsorbent flow controller zone 23 wherein it is joined with the first stream of enriched adsorbent formed in primary rectification zone 17 as previously described.

Adsorbent flow controller zone 23 is formed between tertiary tray 87 of the side cut gas zone and primary tray 88 of the rich gas zone. Integrally attached to rich gas zone primary tray 88 and extending downward therefrom in concentric position with side cut gas quarternary tubes 83 are rich gas zone primary tubes 89. Integrally attached to primary tray 88 and arranged about primary tubes 89 in a regular geometrical pattern are riser tubes 90 which extend upward from rich gas zone primary tray 88 so that the upper extremity exists at a level which is somewhat higher than the level of the lower extremities of tubes 86 previously described. The combination of side cut gas zone quaternary tubes 85, rich gas zone primary tray 88, rich gas zone primary tubes 89, and riser tubes 90 forms a means for the mechanical control over the ratio of the flow rates of the first and second streams of adsorbent previously described. The first of the streams of adsorbent which flows downwardly through side cut gas quarternary tubes 83 as a first fraction of an enriched adsorbent is discharged into tubes 89 wherein it is joined with the second of the adsorbent streams, the second enriched adsorbent fraction, which flows downwardly through tubes 74 and through the side cut gas zone to form a stream of combined enriched adsorbent upon which is adsorbed the total amount of the more readily adsorbable constituents of the gaseous mixture together with some constituents of intermediate adsorbability. This combined enriched adsorbent is discharged from adsorbent flow controller zone 23 into secondary rectification zone 25.

The combined enriched adsorbent introduced into secondary rectification zone 25 is contacted therein with a rich gas which is virtually free of constituents of intermediate adsorbability and which contains a very high concentration of the more readily adsorbable constituents. This rich gas passes upwardly through and countercurrently contacts the combined enriched adsorbent in secondary rectification zone 25. Again, because of the preferential adsorption characteristics of the adsorbent, a desorption of the constituents of intermediate adsorbability occurs and the constituents contained in the rich gas are in turn adsorbed forming a rectified adsorbent. The gas thus desorbed forms the secondary reflux gas previously described, a portion of which is removed from secondary reflux gas disengaging zone 24 and is returned to secondary reflux gas engaging zone 18 as the external secondary reflux gas stream while the remainder is conveyed as the internal secondary reflux gas stream into secondary side cut rectification zone 22.

The internal secondary reflux gas stream flows upwardly from secondary reflux gas disengaging zone 24 through riser tubes 90 into adsorbent flow controller zone 23 wherein it engages the adsorbent contained therein. This gas passes upwardly into second side cut rectification zone 22 countercurrent to the downward flowing enriched adsorbent by means of the annular spaces formed between tertiary tubes 86 and tubes 83. The gas thus introduced comprises an internal reflux gas which permits adsorption in the second side cut rectification zone 22 of the more readily adsorbable constituents contained therein and desorption therein of the constituents of intermediate adsorbability present on the adsorbent. The remainder of secondary reflux gas is removed from secondary reflux gas disengaging zone 24 as an external stream and is conveyed through line 80 and valve 81 to primary rectification zone 17 through zone 18. Variation in the ratio of the external flow of secondary reflux gas, i. e., that introduced into primary rectification zone 17, to the internal flow, i. e. that introduced into second side cut rectification zone 22 through riser tubes 90 as previously described, may be accomplished by the opening or closing of valve 81 which controls the flow rate at which secondary reflux gas is removed from zone 24 and introduced into zone 18. In this manner by careful control of reflux requirements, efficient use of the adsorbent may be obtained so that the minimum amount of adsorbent per given quantity of a gaseous mixture to be separated is required.

By desorbing the constituents of intermediate adsorbability from the adsorbent in secondary rectification zone 25 as previously described, a rectified adsorbent is formed which is substantially free of adsorbed constituents of lower and intermediate adsorbability and which contains the more readily adsorbable constituents adsorbed thereon. This rectified adsorbent is discharged from secondary rectification zone 25 into steaming zone 27 through rich gas disengaging zone 26 which is formed by rich gas zone secondary tray 91 and rich gas zone secondary tubes 92. Secondary tubes 92 are integrally attached to and extend downward from secondary tray 91 into steaming zone 27. Steaming zone 27 is formed between rich gas disengaging zone 26 and rich gas zone tertiary tray 93 which also comprises the upper tube sheet of heating zone 28.

The rectified adsorbent present within steaming zone 27 is contacted wth a stripping gas such as, for example steam. Under controlled conditions of temperature and pressure of operation, steam is much more readily adsorbable than the more readily adsorbable constituents adsorbed on the rectified adsorbent. The stripping gas countercurrently contacts the rectified adsorbent in steaming zone 27 at a low temperature in the absence of indirect heating wherein the minimum temperature does not exceed 200° F. The stripping gas serves to desorb from the adsorbent the major proportion of adsorbed constituents forming a rich gas containing the more readily adsorbable constituents. The rich gas thus formed moves upwardly countercurrent to the downwardly flowing rectified adsorbent and is disengaged therefrom into rich gas disengaging zone 26. A portion of the rich gas thus desorbed progresses upwardly through secondary tubes 92 and enters secondary rectification zone 25 wherein it serves to desorb a secondary reflux gas from the enriched adsorbent contained therein. A net production comprising the remaining portion of rich gas is withdrawn from rich gas disengaging section 26 by means of line 56 controlled by valve 57 and is sent to production or further processing, not shown.

The adsorbent flowing downward from steaming zone 27 enters the tubes of heating zone 28 wherein it is subjected to indirect heating and contacted by further quantities of the stripping gas serving to remove from the adsorbent the last vestiges of the more readily adsorbable constituents thereby forming a lean adsorbent. As more clearly indicated in Figure 1 this lean adsorbent flows downwardly and eventually accumulates in bottom zone 30 in adsorption column 10, is removed therefrom and is subsequently returned to the upper portion of adsorption column 10. The lean adsorbent flows downwardly through cooling zone 13 to form a cooled lean adsorbent which is discharged into adsorbent zone 70.

Highly desirable for the efficient and smooth operation of the selective adsorption process and apparatus of my invention is an accurate continuous method of control of the flow rates of reflux and product gases. The primary reflux gas and the secondary reflux gas flow rates are of considerable importance in maintaining the extreme purity of the side cut gas and other product gases produced. By producing and returning to the feed gas zone a proper amount of primary reflux, the less readily adsorbable constituents which are present adsorbed on the adsorbent entering the side cut gas zone are prevented from contaminating the side cut gas. As in the case of the primary reflux gas, the production of the proper amount of secondary reflux gas insures the absence from the rich gas product of constituents of intermediate adsorbability which are desired in the side cut gas product. In conjunction with flow control of the primary and secondary reflux gases in producing pure products at high recovery is the flow control of the rich gas product and the side cut gas product. Flow control of the gas streams previously mentioned is preferably accomplished by employing temperature control instruments which are adapted to cause changes in flow rate in accordance with a changing temperature.

The adsorption of gases on adsorbents, and particularly on activated carbon, is exothermic. Since the higher molecular weight constituents of a gaseous mixture are generally more readily adsorbable than constituents in the gaseous mixture of lower molecular weight, the temperature of the moving bed of adsorbent flowing downwardly through the selective adsorption column is characteristic at any given point of the composition of the gas being adsorbed. This temperature within the adsorbent bed is partly attributable to the different magnitude of the heats of adsorption of different constituents and is principally due to the fact that constituents which are more readily adsorbable liberate greater quantities of heat during adsorption which manifests itself as an increased temperature of the adsorbent. These temperature differences which occur in the moving bed of adsorbent in a selective adsorption column are substantially greater over a given distance through the column than those occurring in a corresponding column for a separation by fractional distillation in which moderate temperature differences occur from tray to tray. These temperature differences change so abruptly with position in the adsorbent bed that they have been termed temperature breaks. These temperature breaks may be located within the adsorbent bed by measuring the temperature of the adsorbent with a series of thermocouples or thermometers or with other suitable devices. The temperature breaks correspond to the separation points between various constituents of the gaseous mixture being separated. For example, in the separation of light hydrocarbon gases by continuous selective adsorption on activated carbon at a pressure of about 100 p. s. i. g., the temperature of the carbon which is in equilibrium with $C_1$ hydrocarbon or methane may be about 120° F., while the temperature of the same adsorbent under similar conditions of pressure in equilibrium with the $C_2$ hydrocarbons is about 40° F. greater, or about 160° F. This $C_1$–$C_2$ hydrocarbon temperature break has therefore, a value of about 40° F. and may occur over a distance in height in the adsorbent bed as small as about 2 to 5 feet. The temperature of the same adsorbent in equilibrium with $C_3$ hydrocarbons may be as high as 250° F., giving a maximum $C_2$–$C_3$ hydrocarbon temperature break of as much as 90° F., although a temperature break of 50 to 60° F. would be normal for the $C_2$–$C_3$ separation.

Temperature means of flow control comprising temperature controller instruments which are actuated by changes in position within the adsorption bed of the aforementioned temperature breaks forms perhaps the most efficient method of achieving automatic control of the selective adsorption process operation according to my invention. The fact that these temperature differences or temperature breaks are very sharp and the temperatures vary markedly with position in the adsorbent bed is the basis for a highly sensitive means for controlling the flow rates of such gas streams as the primary reflux gas, the secondary reflux gas, the side cut gas product and the rich gas product and other gas streams, if desired.

The positioning of thermocouple points or other suitable temperature sensitive means at proper positions within the various zones serves as a means for actuating a temperature recorder controller or other similar temperature actuated controller means. The controllers in turn actuate the flow control valves which may be pneumatic flow control valves situated in the reflux or product gas lines. Figure 2 shows one of the satisfactory methods of utilizing temperature control instruments for controlling gaseous flow rates. In Figure 2 it will be seen that thermocouple point 94 serves to actuate temperature recorder controller 95 which in turn opens or closes valve 54 thereby controlling the rate at which primary reflux gas is withdrawn from zone 19 and mixed with the gaseous mixture to be separated. Point 94 is positioned at a depth in the adsorbent present in first side cut rectification zone 20 so that a primary reflux of desired composition will be produced. Increasing the depth decreases the concentration of constituents of intermediate adsorbability in the primary reflux gas. Similarly, thermocouple point 96, which is shown positioned above secondary tray 75 of feed gas engaging zone 16, but which may be placed below at 96a in the upper portion of primary rectification zone 17, serves to actuate temperature recorder controller 97 which in turn opens or closes valve 85 thus controlling the side cut gas flow rate. Thermocouple point 96 which actuates control instrument 97 in controlling the side cut gas product flow rate may alternatively be positioned at 96b adjacent to the point of removal of the side cut gas from disengaging zone 21. Thermocouple point 98 situated within rich gas rectification zone 25 actuates temperature recorder controller 99 which controls the rich gas production rate by opening or closing valve 57. The depth in the adsorbent of thermocouple point 98 affects the composition of the secondary reflux gas as in the case of the position of thermocouple point 94. The thermocouple point 121 may be employed positioned in the feed gas zone to actuate a control instrument 122 to control valve 81 which controls the rate of flow of external secondary reflux in line 80. Instrument or manual control of valve 81 depends largely upon the feed gas composition and the operation pressure.

Temperature recorder controller 97 connected to thermocouple point 96 serves to close valve 85 if the adsorbent temperature to which point 96 is exposed rises above a certain preset value. Thus, when constituents of intermediate adsorbability progress upward through feed gas adsorption zone 15 to a level approximating that of point 96 the temperature of the adsorbent at that point increases because of the adsorption thereon of the constituents of intermediate adsorbability. The temperature of the adsorbent in the presence of constituents of intermediate adsorbability tends to rise above the temperature of the adsorbent which is in the presence of constituents of lower adsorbability because of the combination of the differential heats of adsorption between the two constituents and the increased degre of adsorption of the constituents of intermediate adsorbability Thus, when the temperature indicated by thermocouple point 96 increases, temperature recorder controller 97 causes valve 85 to open increasing somewhat the rate of production of side cut gas product. As the rate of side cut gas production is increased the level in side cut gas rectification zone 20 to which the presence of constituents of intermediate adsorbability extends falls somewhat causing the temperature indicated by thermocouple point 94 to decrease. This decrease in temperature actuates temperature controller 95 so that valve 54 is closed somewhat causing a decrease in the rate of primary reflux gas flow and a decrease in the concentration of constituents of intermediate adsorbability present in the combined feed introduced into feed gas engaging zone 16. In turn, this reduction causes a decrease in the level to which the presence of these constituents extend upward into feed gas adsorption zone 15 and subsequently results in a decrease in the temperature indicated by thermocouple point 96. By controlling to a given temperature at point 96 a minimum concentration of constituents of intermediate adsorbability may be maintained in the lean gas product.

The function of temperature recorder controller 99 in actuating valve 57 to control the rate of rich gas production is very similar to that just described with regard to temperature recorder controllers 95 and 97. Whereas, for example, if a gaseous mixture being separated comprises a normally gaseous mixture of low molecular weight hydrocarbons, the temperature indicated by point 96 will be in the range between about 120° F. and 140° F. depending upon the operating pressure. The temperature indicated by thermocouple point 94 will be between about 120° F. and 160° F., and the temperature to which thermocouple point 98 is set to actuate temperature recorder controller 99 will be between about 160° F. and 250° F. As the temperature of the adsorbent indicated by thermocouple 98 increases, temperature recorder controller 99 opens control valve 57 increasing the rate of rich gas removal from rich gas disengaging zone 26. As this rate of removal is increased the rate of rich gas reflux into rich gas rectification zone 25 is decreased causing a decrease in temperature at point 98 and a corresponding opening of control valve 57.

Steam as a stripping gas may be very conveniently used to aid in the desorption from the adsorbent of the more readily adsorbable constituents present in the gaseous mixture being separated. It is a characteristic of steam or water vapor when in the presence of various adsorbents to be more readily adsorbable than the more readily adsorbable constituents adsorbed on the adsorbent. Furthermore, and more specifically, the use of steam as a stripping gas for desorption of adsorbed constituents on activated carbon is particularly advantageous because of the fact that steam under certain conditions of temperature at a given pressure is very highly adsorbed by the activated carbon. A small increase in temperature, for example, about 30° F. or 40° F. can effect a substantially complete desorption of the steam from the adsorbent. This characteristic of steam has proved extremely useful in the operation of the selective adsorption process with activated carbon adsorbents, according to my invention. The presence of steam in contact with activated carbon, for example, causes a sharp temperature differential or temperature break to appear between the upper and lower portions of steaming zone 27 shown both in Figures 1 and 2. This temperature break may be employed to considerable advantage in controlling the amount of steam or other stripping gas which is removed with the rich gas product and simultaneously to insure the presence of a sufficient amount of steam or other stripping gas for the internal stripping gas recycle within the desorption zone as previously described. The temperature within the steaming zone is markedly dependent upon the operation pressure of the desorption zone and the temperature is generally about 20° F. above the vapor temperature of saturated steam at the operation pressure. When stripping gases other than steam are employed a similar relation holds between temperatures of the adsorbent in the feed gas adsorption zone, side cut rectification zones, the secondary rectification zone, and the steaming zone. A temperature recorder controller 60 indicated in Figure 1 is employed as has been just previously described as a method for controlling the rate of steam input to the desorption zone. The temperature recorder controller 60 is actuated by a temperature control point positioned within steaming zone 27 and in contact with the downwardly moving adsorbent therein. Changes in temperature of the adsorbent in this zone actuate the temperature recorder controller which in turn adjusts control valve 59 so as to increase or decrease the amount of steam added.

There are two factors of importance which must be considered in proper temperature control of the selective adsorption operation in order to produce and recover gases of high purity having the desired composition. These factors are, first, the position of the temperature control thermocouples within the column in contact with the downwardly moving adsorbent, and second, the temperature to which the temperature control instruments are adjusted. In connection with the first factor, the position of the thermocouple or other temperature sensitive means is best determined by calculation or by actual measurement of the equilibrium adsorbent temperature with a plurality of thermocouples so as to determine the position of the temperature break. By controlling the rate of production of one or more of the gas products so as to maintain a temperature break at a given location or position within the adsorbent bed in the vicinity of or adjacent to the point of product removal or between the point of product removed and the removal point of a product which is less readily adsorbable, gas products consistently having the desired composition and at high recovery may be produced. The second factor, the temperature control instrument setting, is generally best satisfied through the adjustment of the instrument to an optimum temperature which corresponds to the temperature of the adsorbent in the adsorption bed which changes most rapidly with depth. That is to say, the temperature control instrument should be set at a temperature which is equal to the temperature at which the slope of the curve showing the relationship between adsorbent temperature and position within the adsorption bed has the greatest slope. Some compensation for misplacement of the temperature control point may be made by altering the temperature control instrument setting to either a higher or lower temperature than the optimum temperature cited above. It is also possible to increase or decrease the sensitivity of the temperature flow control by changing the temperature control instrument setting so that it corresponds to a temperature different than the optimum temperature. Such reductions in sensitivity, especially in the case where the temperature break is extremely sharp, are of advantage to eliminate periodic opening and closing of the control valve on regular cycles caused by the gradual shifting up and down through the adsorbent bed of the temperature break. This condition is known as "hunting" and is due mainly to an abnormally high instrument sensitivity. Through careful consideration of these two factors, lean gas, side cut gas, and rich gas products may be produced at high recovery and having the desired purity. The compositions of the primary, secondary and the internal reflux gases may be also controlled by maintaining a temperature break in the vicinity of the point at which one of the product gases or primary or secondary reflux gases are withdrawn. Such maintenance of the temperature breaks adjacent to the withdrawal points of gaseous refluxes or products serves to insure the production of gases having the desired purity and at high recovery and in general permits ease and trouble-free operation.

Referring now more particularly to Figure 3, there is shown an enlargement in cross section of adsorbent distributor zone 11. As previously described, the separated lift gas-adsorbent suspension flows downwardly from impactless separator 38, not shown, through adsorbent transfer line 39 and is discharged into movable means comprising funnel 40 which is positioned at the lower opening thereof. Movable funnel 40 may be constructed so as to have an included apex angle of about 90° and to have an upper opening having a diameter between about 1½ to about 2 times that of the transfer line and may further be equipped with slot 100 which extends from a position near the apex upwardly to a position close to the upper open end of the funnel. Movable funnel 40 supported by suspension rod 101 which extends upward through the upper side of transfer line 39 and through the top of adsorption column 10. Driving means 102 and bearings 103 are provided which permit movable funnel to be rotated at an angular velocity of between about 10 and 100 revolutions per minute depending upon the amount of adsorbent being circulated and the size of the adsorption column. The adsorbent flowing downwardly through transfer line 39 enters movable funnel 40 and is discharged therefrom by means of slot 100. The lean gas leaves the funnel by means of the upper open end of the funnel and by means of slot 100 and is withdrawn from the top of adsorption column 10 by means of lean lift gas return line 41. Continuous elutriation of the adsorbent thus introduced into the column is effected in that the lean gas carries with it fines of adsorbent which are undesirable. The lean lift gas withdrawn from the upper portion of the column includes also the lean drying gas which passes upwardly through cooling zone 13 countercurrent to the downwardly flowing adsorbent as previously described. This gas is disengaged from the adsorbent in drying gas disengaging zone 12 and proceeds upwardly through tube 42 to mix with the lean lift gas. Tube 42 is of a somewhat smaller diameter than lean lift gas return line 41 and is aligned on the same vertical axis as movable funnel suspension rod 101 but is positioned so that the upper extremity of tube 42 does not interfere with the rotary motion of movable funnel 40. Drying gas tube 42 is integrally attached to and extends upwardly from tray 104 of drying gas disengaging zone 12. Zone 12 also contains tubes 105 which are integrally attached to and extend downwardly from tray 104. Disposed in a horizontal plane and in a regular geometrical pattern around tube 42 is a plurality of stationary means comprising funnels 106 which serve to receive the adsorbent discharged from movable funnel 40. Funnels 106 are integrally attached to and extend downwardly from tray 107 which is parallel to tray 104 previously described and situated above tray 104 a distance which is about equal to one-half the height of drying gas tube 42. The particular adsorption column being described contains six stationary funnels 106, however, by decreasing the base diameter of the funnel and by employing other geometrical arrangements, virtually any number of funnels may be used. The function of funnels 106 is to receive and mix the adsorbent discharged from movable funnel 40 and to distribute the discharged adsorbent uniformly with respect to particle size and quantity over the entire cross sectional area of adsorption column 10. The possibility of the occurrence of accumulations of fines or smaller size granules of adsorbent in one particular area of the column cross section is thus eliminated. Such an accumulation of fines, if it occurred, would lead to channeling of the feed gas and other gas flows which pass through the adsorbent bed. Because of the higher pressure drop required to force a gas through a bed of small diameter granules, the gas would tend to flow through that part of the adsorbent bed which contains the least quantities of fines. By distributing the total amount of discharged adsorbent into a series of funnels such as funnels 106 a thorough mixing results which, in conjunction with the mixing of tubes 105 of drying gas disengaging section 12 and continuous elutriation of the incoming adsorbent serves to completely eliminate the possibility of fines accumulation.

The improved selective adsorption process and apparatus of my invention is particularly well adapted to the production of intermediate fractions of a given gaseous mixture or heart cuts containing constituents of intermediate molecular weight or intermediate adsorbability of a given gaseous mixture. The preparation of a heart cut of high purity from a liquid mixture by fractional distillation or from a gaseous mixture by selective adsorption ordinarily requires, respectively, two fractional distillation columns or two selective adsorption columns. It is possible to prepare a fraction of intermediate molecular weight, boiling point, or critical temperature by removing a side cut from a fractional distillation column. Such a side cut, however, from fractional distillation columns is contaminated with substantial quantities of constituents normally removed in the overhead and bottoms fractions. It is also possible in the separation by selective adsorption of gaseous mixtures to remove a side cut containing constituents of intermediate adsorbability. However, such a side cut also is contaminated with constituents normally produced in the lean and rich gas streams.

By the process and apparatus of my invention as hereinbefore described, I have found it possible to utilize a single selective adsorption column or a single selective adsorption operation to separate a gaseous mixture into a plurality of fractions including a heart cut of extreme purity at least equal to the purity obtainable in similar processes utilizing two selective adsorption columns. A comparison of the purity of the heart cut gas and other gas products obtainable in a process using two selective adsorption columns with the process of selective adsorption according to my invention may be obtained with reference to the following examples in which the operation of the process and apparatus is described as utilizing activated charcoal as the adsorbent and is applied to separation of a cracked gas mixture produced in the thermal pyrolysis of hydrocarbon gases.

*Example I*

The cracked gas feed amounting to 15,700 MSCF/SD (one MSCF/SD is equal to 1,000 standard cubic feet per stream day) at a pressure of 30 pounds per square inch gauge and a temperature of 110° F. is compressed to a pressure of 120 pounds per square inch gauge whereby certain heavier molecular weight constituents contained in the gaseous mixture are condensed. The condensate thus formed is separated from the compressed gas in a suitable separator. The uncondensed gas amounts to about 15,200 MSCF/SD and has the following composition:

| Constituent | Per Cent By Volume |
|---|---|
| Hydrogen | 10.8 |
| Methane | 31.5 |
| Ethylene | 24.2 |
| Ethane | 9.7 |
| Propylene | 16.6 |
| Propane | 7.2 |
| $C_4$'s | 0.0 |
| | 100.0 |

This gas is introduced at a temperature of 100° F. at a pressure of 115 pounds per square inch gauge into the first of two selective adsorption columns which is required to be 12.0 feet in diameter and through which is maintained a continuous flow of activated charcoal moving at a rate of about 100 tons per hour. This primary selective adsorption column is equipped to separate feed gas into three fractions, specifically a lean gas, a side cut gas, and a rich gas. The operation is so carried out as to produce a lean gas which contains predominantly methane and hydrogen, a side cut gas which contains predominantly ethylene and ethane, and a rich gas which contains propylene, propane and $C_4$ hydrocarbons present in the feed. The lean gas is produced at a rate of about 6,440 MSCF/SD, the side cut gas production rate of about 5,570 MSCF/SD, and about 3,190 MSCF/SD of a rich gas is produced. The three product gases have the following compositions:

| Constituent | Per Cent by Volume | | |
|---|---|---|---|
| | Lean Gas | Side Cut Gas | Rich Gas |
| Hydrogen | 25.6 | | |
| Methane | 73.5 | 0.8 | |
| Ethylene | 0.7 | 65.1 | 0.7 |
| Ethane | 0.2 | 26.1 | 0.3 |
| Propylene | | 5.4 | 69.0 |
| Propane | | 2.6 | 29.8 |
| $C_4$'s | | | 0.2 |
| | 100.0 | 100.0 | 100.0 |

In the particular operation of the present example the desired constituents comprise ethylene and ethane which are desirable in as pure a fraction as possible. From observation of the side cut gas analysis given above it will be noted that this side cut gas contains about 91% by volume of $C_2$ hydrocarbons and contains more than 8% by volume of $C_3$ hydrocarbons which are undesirable. In order to purify the side cut obtained from the primary selective adsorption column this primary side cut gas must be further treated for removal therefrom of the $C_3$ hydrocarbons. Such a secondary selective adsorber operates at a pressure of about 110 pounds per square inch gauge and for the separation requires an activated charcoal adsorbent flow of about 21 tons per hour. The secondary selective adsorption column is 7.0 feet in diameter and is adapted to produce two product streams, a lean gas and a rich gas. The primary side cut gas previously described is introduced at a rate of 5,570 MSCF/SD into the secondary selective adsorption column from which a lean gas is produced at a rate of 5,120 MSCF/SD containing the desired $C_2$ hydrocarbons in a state of high purity and a rich gas is produced at a rate of about 450 MSCF/SD which contains the $C_3$ hydrocarbons in substantially pure form which were objectionable in the primary side cut gas. The composition of the feed to the secondary selective adsorption column is identical with that given in the previous tabulation for the primary side cut gas and will not be repeated. The compositions of the lean and rich gases produced from the secondary selective adsorption column are as follows:

| Constituent | Per Cent by Volume | |
|---|---|---|
| | Lean Gas | Rich Gas |
| Hydrogen | | |
| Methane | 0.9 | |
| Ethylene | 70.7 | 0.9 |
| Ethane | 28.4 | 0.3 |
| Propylene | | 67.0 |
| Propane | | 31.8 |
| $C_4$'s | | |
| | 100.0 | 100.0 |

Observation of the analysis of the lean gas obtained from the secondary selective adsorption column indicates that this stream contains about 99% by volume of the desired $C_2$ hydrocarbons, ethylene and ethane, as compared with the primary side cut gas which contained about 91% by volume of these constituents.

It is possible to replace the primary and secondary selective adsorption columns utilized in the previous example by a single selective adsorption column which operates according to the process of my invention. The characteristics of operation of the improved selective adsorption process according to my invention when applied to the separation of the same gaseous mixture as feed as in the previous example are indicated in the following example wherein the desired constituents are the $C_2$ hydrocarbons.

Example II

A gaseous feed is introduced at a rate of about 15,200 MSCF/SD at a pressure of 115 pounds per square inch gauge and a temperature of 100° F. into the improved selective adsorption column according to my invention as previously described. The selective adsorption column required for the separation is 11.0 feet in diameter and employs an activated charcoal adsorbent circulation rate of about 120 tons per hour. Of this total charcoal circulation rate, about 80% or about 95 tons per hour flows downwardly through the feed gas zone of the improved selective adsorption column while the remaining 20% or about 25 tons per hour flows downwardly through and independent of the feed gas zone and is discharged into and flows downwardly through the side cut gas zone. The two independent charcoal streams are subsequently joined to form a combined charcoal stream prior to introduction into the rich gas rectification zone.

The composition and flow rates of the feed gas, lean gas, side cut gas, and rich gas streams are indicated in the following tabulation:

| Constituent | Per Cent by Volume | | | |
|---|---|---|---|---|
| | Feed Gas | Lean Gas | Side Cut Gas | Rich Gas |
| Hydrogen | 10.8 | 25.6 | | |
| Methane | 31.5 | 73.5 | 0.8 | |
| Ethylene | 24.2 | 0.7 | 70.7 | 0.7 |
| Ethane | 9.7 | 0.2 | 28.5 | 0.3 |
| Propylene | 16.6 | | Trace | 68.8 |
| Propane | 7.2 | | Trace | 30.1 |
| $C_4$'s | | | | 0.1 |
| | 100.0 | 100.0 | 100.0 | 100.0 |
| Flow rate MSCF/SD | 15,200 | 6,500 | 5,100 | 3,600 |

The side cut gas amounts to about 5100 MSCF/SD and contains 99.0% by volume of the desired $C_2$ hydrocarbon constituents. On comparison with the concentration of $C_2$ hydrocarbons of the feed it will be noted that a volumetric $C_2$ hydrocarbon recovery in the side cut gas of 98.0% by volume is attained.

It is to be understood, however, that the specific separations of hydrocarbon gas mixtures used in the two previous examples, is used here only in the purposes of clear description and that my invention of an improved apparatus and process for the separation by selective adsorption of gaseous mixtures applies equally well to other hydrocarbon or nonhydrocarbon gaseous mixtures. The process and apparatus herein described is particularly well adapted to the separation of mixtures of hydrogen and C2 hydrocarbons such as ethylene and ethane. A pure side cut containing better than 99 volume per cent C2 hydrocarbons may be prepared which may subsequently be subjected to low temperature fractionation to prepare pure ethylene which is of considerable value in chemical synthesis.

For application to the selective adsorption process as herein described, granular adsorbents ranging from 10 to 14 mesh in size is preferred. However, I have found that other ranges of particle size are applicable. In some specific applications, granules as large as about two mesh are applicable and in certain other specific instances powdered adsorbents may be applied having small granules as fine as about 100 mesh or finer may be used. Of the various adsorbents which are applicable for use in the selective adsorption process as herein described, I prefer to employ activated granular charcoal and particularly an activated vegetable charcoal with granules of from 10 to 14 mesh in size, although other adsorbents such as silica gel, activated alumina, activated bauxite, animal and mineral carbons, and various adsorbents prepared from iron and chromium oxides, and other adsorbents are applicable.

In the description of the improved selective adsorption apparatus the adsorbent was conveyed from the lower portion of the selective adsorption column to the upper portion thereof by means of a gas lift employing a fraction of the lean gas produced in the process. In certain instances other typical means of conveying granular solids may be employed such as the utilization of elevator means positioned in a proper housing so as to withstand the pressure of operation. The utilization of a gas lift, however, is preferred in view of certain difficulties of maintenance and operation of elevators at elevated pressures.

Characteristics of adsorbent flow distributor zone 11 may be varied through various modifications thereof which include employment of other movable means for distribution of adsorbent beside movable funnel 40 shown in Figure 3. Further, stationary funnels 106 may be replaced with segmental division of the tray 107 or either may be utilized in conjunction with a number of short tubes as mixers similar in construction to that indicated in various engaging and disengaging zones in the column.

In Figures 2 and in conjunction with location of thermocouple points associated with controller for gas flow rates, it should be understood that the indicated location of such thermocouple points in Figure 2 may be varied to advantage depending upon feed gas and operation characteristics.

Having described and illustrated my invention and realizing that many modifications thereof other than those indicated will occur to those skilled in the art without departing from the spirit or scope of the following claims.

I claim:

1. A continuous process for the separation by selective adsorption of a normally gaseous mixture into a plurality of fractions thereof containing constituents of differing adsorbability which comprises contacting said gaseous mixture in a feed gas zone with a first fraction of solid granular adsorbent in a moving bed so as to adsorb more readily adsorbable constituents of said gaseous mixture to form a rich adsorbent and a lean gas which contains less readily adsorbable constituents, removing said lean gas from said feed gas zone, contacting a second fraction of said adsorbent in a side cut gas zone with one portion of a secondary reflux gas containing more readily adsorbable constituents thereby adsorbing on said second fraction of said adsorbent the most readily adsorbable constituents of said reflux gas and leaving unadsorbed constituents of intermediate adsorbability as a purified side cut gas, removing a portion of said side cut gas from said side cut gas zone, employing the remaining portion as reflux in said side cut gas zone to desorb from said adsorbent present therein the less readily adsorbable constituents to form a primary reflux gas, removing said primary reflux gas from said side cut gas zone, returning said primary reflux gas at a controlled flow rate to said feed gas zone, combining said first and second fractions of said adsorbent to form a combined adsorbent, introducing the thus combined adsorbent into a rectification zone, contacting said combined adsorbent therein with a rich gas thereby desorbing less readily adsorbable constituents adsorbed on said adsorbent to form said secondary reflux gas, passing a portion of said secondary reflux gas into said side cut gas zone, removing the remaining portion of said secondary reflux gas from said rectification zone, returning the secondary reflux gas at a controlled rate to said feed gas zone to serve as reflux therein, subsequently desorbing the most readily adsorbable constituents adsorbed on the adsorbent to form a rich gas, passing a portion of the rich gas thus desorbed into said rectification zone to serve as reflux therein and removing the remaining portion of said rich gas as a rich gas product.

2. A process according to claim 1 in which the rate of flow of the portion of the side cut gas removed from the side cut gas zone is controlled in accordance with the position of a temperature break maintained within the side cut gas zone.

3. In the process for the continuous separation of a normally gaseous mixture by selective adsorption on a solid granular adsorbent wherein one portion of one of the product gases is removed and the remainder is returned as reflux, the improvement which comprises controlling the flow rate at which said product gas is removed and thereby controlling the proportion returned as reflux so as to maintain a temperature break in the vicinity of the point at which said product gas is removed.

4. A continuous process for the separation by selective adsorption of a normally gaseous mixture into a plurality of fractions thereof containing constituents of differing adsorbability which comprises contacting said gaseous mixture in a feed gas zone with a first fraction of a solid granular adsorbent in a moving bed so as to adsorb the more readily adsorbable constituents of said gaseous mixture to form a rich adsorbent and a lean gas which contains the less readily adsorbable constituents, removing said lean gas from said feed gas zone as a lean gas product, contacting a second fraction of said adsorbent in a side cut gas zone with a first portion of a secondary reflux gas containing constituents of intermediate adsorbability, thereby adsorbing on said second fraction of said adsorbent the most readily adsorbable constituents of said reflux gas and leaving unadsorbed said constituents of intermediate adsorbability as a purified side cut gas, removing at least a portion of said purified side cut gas as a side cut gas product, subsequently combining said first and second fractions of said adsorbent to form a combined adsorbent which is introduced into a rectification zone, contacting said combined adsorbent within said rectification zone with a rich gas reflux thereby desorbing said secondary reflux gas containing constituents of intermediate adsorbability, passing a first portion of the thus desorbed secondary reflux gas into said side cut gas zone as described, separating the remaining portion of said secondary reflux gas from the adsorbent in said rectification zone, returning said remaining portion of said secondary reflux gas to said feed gas zone at a controlled flow rate, and thereby controlling the relative rates of flow of the said portions of said secondary reflux gas.

5. A process according to claim 4 in which the rate of flow of the return of the remaining portion of the secondary reflux gas to the feed gas zone is controlled in accordance with the position of a temperature break maintained within the feed gas zone.

6. A continuous process for the separation of a normally gaseous mixture by selective adsorption into a plurality of fractions thereof containing constituents of differing adsorbability which comprises contacting said gaseous mixture in a feed gas zone with a first fraction of a granular adsorbent in a moving bed so as to adsorb the more readily adsorbable constituents of said gaseous mixture to form a rich adsorbent and a lean gas which contains the less readily adsorbable constituents, removing said lean gas from said feed gas zone as a lean gas product, contacting a second fraction of said granular adsorbent in a side cut gas zone with one portion of a secondary reflux gas containing more readily adsorbable constituents thereby adsorbing on said second fraction of said adsorbent the most readily adsorbable constituents of said secondary reflux gas and leaving unadsorbed constituents of intermediate adsorbability as a purified side cut gas, removing a first portion of said side cut gas from said side cut gas zone as a side cut gas product, employing the second portion of said purified side cut gas as reflux in said side cut gas zone thereby desorbing from said granular adsorbent the less readily adsorbable constituents adsorbed thereon to form a primary reflux gas, and removing said primary reflux gas from said side cut gas zone.

7. A process according to claim 6 in which the rate of flow of the first portion of side cut gas removed from the side cut zone as a side cut gas product is controlled in accordance with the position of a temperature break maintained within the side cut gas zone.

8. A process according to claim 6 in which the primary reflux gas is returned to the feed gas zone at a controlled flow rate.

9. A continuous process for the separation of a normally gaseous mixture into a plurality of fractions thereof containing constituents of differing adsorbability by selective adsorption on solid granular charcoal which comprises introducing said gaseous mixture into a feed gas adsorption zone, contacting said gaseous mixture therein with a first fraction of lean charcoal thereby adsorbing the more readily adsorbable constituents of said gaseous mixture to form a rich charcoal and a lean gas containing less readily adsorbable constituents, removing at least a portion of said lean gas from said lean gas adsorption zone as a lean gas product, flowing said rich charcoal from said feed gas adsorption zone to a primary rectification zone, contacting said rich charcoal therein with a portion of a secondary reflux gas containing constituents of intermediate adsorbability to form a first fraction of an enriched charcoal, contacting a second fraction of said lean charcoal in a first side cut gas rectification zone with a side cut gas reflux containing constituents of intermediate adsorbability thereby desorbing a primary reflux gas from said first side cut gas rectification zone and forming a partially enriched charcoal, removing said primary reflux gas from said first side cut gas rectification zone, controlling the rate of flow of primary reflux gas thus removed, contacting said partially enriched charcoal in a second side cut rectification zone with a second portion of said secondary reflux gas thereby desorbing from said partially enriched charcoal constituents of intermediate adsorbability to form said side cut gas and a second fraction of enriched charcoal, removing said side cut gas as a side cut gas product, combining said first and second fractions of said enriched charcoal to form a combined charcoal, passing said combined charcoal into a secondary rectification zone, contacting said combined charcoal therein with a rich gas reflux containing more readily adsorbable constituents thereby desorbing from said combined charcoal less readily adsorbable constituents to form said secondary reflux gas and a rectified charcoal, passing a portion of said secondary reflux gas into said second side cut gas rectification zone to serve as reflux therein, removing the remaining portion of secondary reflux gas from said secondary rectification zone, controlling the rate of flow of secondary reflux gas thus removed, introducing said secondary reflux gas at a controlled rate of flow into said primary rectification zone, subsequently desorbing from said rectified charcoal more readily adsorbable constituents adsorbed thereon to form a rich gas, passing a portion of said rich gas into said secondary rectification zone to serve therein as reflux, and removing the remaining portion of rich gas as a rich gas product.

10. A process according to claim 9 in which the rate of flow of the primary reflux gas removed from the first side cut gas rectification zone is controlled in accordance with the position of a temperature break maintained within the first side cut rectification zone.

11. A process according to claim 9 in which the primary reflux gas is returned at a controlled flow rate to the feed gas adsorption zone.

12. A continuous process for the separation of a normally gaseous mixture into a plurality of fractions thereof containing constituents of differing adsorbability by selective adsorption on granular charcoal which comprises introducing said gaseous mixture into a feed gas zone, contacting said gaseous mixtures therein with a first fraction of lean charcoal thereby forming a rich charcoal and a lean gas containing less readily adsorbable constituents, removing said lean gas from said feed gas zone as a lean gas product, contacting a second portion of lean charcoal in a side cut gas zone with a portion of a secondary reflux gas containing more readily adsorbable constituents thereby adsorbing on said second fraction of said charcoal the most readily adsorbable constituents of said reflux gas and leaving unadsorbed constituents of intermediate adsorbability as a purified side cut gas, removing a first portion of said side cut gas as a side cut gas product, contacting a second fraction of said lean charcoal in said side cut gas zone with the remaining portion of said side cut gas as reflux thereby desorbing from said lean charcoal a primary reflux gas containing less readily adsorbable constituents, removing said primary reflux gas from said side cut gas zone, controlling the rate of flow of primary reflux gas thus removed in accordance with the position of a temperature break maintained within said side cut gas zone, subsequently desorbing more readily adsorbable constituents from said charcoal to form a rich gas and removing at least a portion of the rich gas thus desorbed as a rich gas product.

13. A process according to claim 12 in which the rate of removal of the first portion of the side cut gas product is controlled in accordance with the position of a temperature break maintained within the side cut gas zone.

14. A process according to claim 12 in which a primary reflux gas removed from the side cut gas zone is returned to the feed gas zone.

15. A continuous process for the separation of a normally gaseous mixture into a plurality of fractions thereof containing constituents of differing adsorbability by selective adsorption on granular charcoal which comprises introducing said gaseous mixture into a feed gas zone, contacting said gaseous mixture therein with a first fraction of lean charcoal thereby adsorbing more readily adsorbable constituents to form a rich charcoal and a lean gas which contains less readily adsorbable constituents of said gaseous mixture, removing said lean gas from said feed gas zone as a lean gas product, contacting a second fraction of said lean charcoal in a side cut gas zone with one portion of a secondary reflux gas containing more readily adsorbable constituents thereby adsorbing on said second fraction of charcoal the most readily adsorbable constituents of said reflux gas and leaving unadsorbed constituents of intermediate adsorbability as a purified side cut gas, removing said side cut gas from said side cut gas zone as a side cut gas product, controlling the rate of flow of the side cut gas product thus removed in accordance with the position of a temperature break maintained within said feed gas zone, combining said first and second fractions of said charcoal to form a combined charcoal, passing said combined charcoal into a rectification zone, contacting said combined charcoal in said rectification zone with a rich gas reflux thereby desorbing constituents of intermediate adsorbability to form a secondary reflux gas and a rich charcoal, introducing a first fraction of said secondary reflux gas into said side cut gas zone to serve therein as reflux, removing the second portion of said secondary reflux gas from said rectification zone, controlling the flow rate of said second fraction of secondary reflux gas thus removed in accordance with the position of a temperature break maintained within said feed gas zone, introducing said second fraction of secondary reflux gas at a controlled flow rate into said feed gas zone, subsequently desorbing from said rich charcoal the most readily adsorbable constituents adsorbed thereon by indirectly heating said rich charcoal and contacting said rich charcoal with a stripping gas to form a rich gas, passing a first portion of said rich gas into said rectification zone to serve therein as reflux, removing the remaining portion of said rich gas as a rich gas product, and controlling the flow rate of rich gas product thus removed in accordance with the position of a temperature break maintained within said rectification zone.

16. A continuous process for the separation of a normally gaseous mixture into a plurality of fractions thereof containing constituents of differing adsorbability by selective adsorption on granular charcoal which comprises maintaining a continuous flow of charcoal in a moving bed downwardly by gravity successively through a feed gas adsorption zone, a primary rectification zone, a first side cut rectification zone, a second side cut gas rectification zone, a secondary rectification zone and a desorption zone, introducing said gaseous mixture into said feed gas adsorption zone, contacting said gaseous mixture therein with a moving bed of a first fraction of lean charcoal thereby adsorbing more readily adsorbable constituents to form a rich charcoal and leaving a substantially unadsorbed gas containing less readily adsorbable constituents as a lean gas, removing said lean gas from said feed gas adsorption zone as a lean gas product, passing said rich charcoal into said primary rectification zone, contacting said rich charcoal therein with a portion of a secondary reflux gas to form a first fraction of an enriched charcoal, contacting a second fraction of said lean charcoal in said first side cut gas rectification zone with a side cut gas containing constituents of intermediate adsorbability thereby desorbing from said lean charcoal less readily adsorbable constituents adsorbed thereon to form a primary reflux gas and a partially enriched charcoal, removing said primary reflux gas from said first side cut gas rectification zone, controlling the flow rate of primary reflux gas thus removed in accordance with the position of a temperature break maintained within said first side cut gas rectification zone, passing said partially enriched charcoal into said second side cut gas rectification zone, contacting said partially enriched charcoal therein with a portion of a secondary reflux gas containing more readily adsorbable constituents thereby desorbing from said partially enriched charcoal constituents of intermediate adsorbability as a side cut gas and forming a second fraction of an enriched charcoal, removing at least a portion of said side cut gas from said second side cut gas rectification zone as a side cut gas product, controlling the flow rate of said side cut gas product thus removed in accordance with the position of a temperature break maintained within said feed gas adsorption zone, combining said first and second fractions of enriched charcoal to form a combined charcoal, contacting said combined charcoal in said secondary rectification zone with a portion of a rich gas reflux thereby desorbing from said combined charcoal a secondary reflux gas and forming a rectified charcoal, returning a first portion of said secondary reflux gas to said second side cut gas rectification zone to serve therein as reflux, removing a second portion of said secondary reflux gas from said secondary rectification zone, controlling the flow rate of said second portion of said secondary reflux gas thus removed in accordance with the position of a temperature break maintained within said primary rectification zone, flowing said rectified charcoal from said secondary rectification zone to said desorption zone, indirectly heating said rectified charcoal in said desorption zone while contacting said charcoal therein with a countercurrent flow of a stripping gas thereby desorbing more readily adsorbable constituents from said rectified charcoal to form a rich gas, passing a portion of said rich gas thus desorbed into said secondary rectification zone as reflux, removing the remaining portion of said rich gas from said desorption zone as a rich gas product and controlling the rate of flow of rich gas product thus removed in accordance with the position of a temperature break maintained within said secondary rectification zone.

17. A process according to claim 16 in which the primary reflux gas removed from the first side cut rectification zone is returned to the feed gas adsorption zone.

18. An apparatus for the continuous separation of normally gaseous mixtures containing constituents of differing degrees of adsorbability into a plurality of fractions by selective adsorption which comprises a vertical selective adsorption column provided at successively lower levels therein with a feed gas zone, a side cut zone, a rectification zone, and a desorption zone, means for maintaining a continuous flow of a solid granular adsorbent out from the bottom of said adsorption column and upwardly and into the top of said adsorption column, means for introducing a first fraction of said adsorbent into the upper part of said feed gas zone, means for introducing a second fraction of lean adsorbent into said side cut gas zone by passing independently through said feed gas zone, said means substantially preventing internal gas flow between said side cut gas and said feed gas zone within said selective adsorption column, means for introducing said gaseous mixture into said feed gas zone to form therein a lean gas and a first fraction of an enriched adsorbent, means for removing said lean gas containing less readily adsorbable constituents from said feed gas zone, means for passing said first fraction of enriched adsorbent from said feed gas zone to said rectification zone by passing independently through said side cut gas zone, said means substantially preventing internal gas flow between said rectification zone and said feed gas zone, means for passing a second fraction of enriched adsorbent from said side cut gas zone to said rectification zone, said first and second fractions of enriched adsorbent thus introduced into said rectification zone being therein combined to form a combined adsorbent, means for removing a primary reflux gas from said side cut gas zone, means in said rectification zone for removing a first portion of secondary reflux gas therein desorbed while passing a second portion thereof into said side cut gas zone to serve therein as reflux, means for passing said first fraction of said secondary reflux to said feed gas zone to serve therein as reflux, means in said desorption zone for desorbing more readily adsorbable constituents from said adsorbent to form a rich gas, and means for removing at least a portion of the rich gas thus formed from said adsorption zone as a rich gas product.

19. An apparatus according to claim 18 in which means are provided for returning the primary reflux gas removed from the side cut gas zone to the feed cut gas zone.

20. An apparatus according to claim 18 in which is provided adsorbent distribution means positioned in the uppermost portion of said selective adsorption column whereby the adsorbent thus introduced is distributed uniformly with respect to particle size and quantity over the entire cross sectional area of the upper portion of said selective adsorption column so as to eliminate the channeling of gas flow upwardly through the downwardly moving bed of granular adsorbent, said adsorbent distribution means consisting of movable means disposed adjacent and below said adsorbent transfer means, stationary means disposed below said movable means wherein said stationary means serve as receivers and mixers for the distributed adsorbent, means for rotating said movable means, and means for conducting a gas flow upwardly through and independent of the adsorbent present in said adsorbent distribution means.

21. An apparatus for the continuous separation of a normally gaseous mixture containing constituents of differing degrees of adsorbability into a plurality of fractions by selective adsorption on a solid granular adsorbent which comprises a vertical selective adsorption column provided at successively lower levels therein with a feed gas adsorption zone, a primary rectification zone, a first side cut rectification zone, a second side cut rectification zone, and a secondary rectification zone, means for maintaining a continuous flow of solid granular adsorbent out from the bottom of said adsorption column and upwardly and into the top of said selective adsorption column, means for introducing a first fraction of said adsorbent into the upper part of said feed gas adsorption zone, means for introducing a second fraction of lean adsorbent into said side cut rectification zone by passing independently through said feed gas adsorption and primary rectification zones, means for passing a first fraction of enriched adsorbent formed in said feed gas adsorption zone from said primary rectification zone to said secondary rectification zone by passing independently through said first and secondary side cut rectification zones, means for removing a second fraction of enriched adsorbent from said second side cut rectification zone, means for controlling the flow rates of said first and second fractions of enriched adsorbent and for combining said fractions to form a combined adsorbent, means for combining said gaseous mixture with a primary reflux gas to form a combined feed, means for introducing said combined feed into said feed gas adsorption zone thereby contacting said first fraction of downwardly flowing lean adsorbent to form a rich adsorbent containing the more readily adsorbable constituents and a lean gas containing the less readily adsorbable constituents of said gaseous mixture, means for removing at least a portion of said lean gas from said feed gas adsorption zone, means for removing a side cut gas containing constituents of intermediate adsorbability from said second side cut rectification zone, means for removing said primary reflux gas from said first side cut rectification zone, means for controlling the rate of flow of said primary reflux gas, means for removing a portion of a secondary reflux gas from said secondary rectification zone, means for controlling the flow rate of said secondary reflux gas, means for introducing a controlled flow of said secondary reflux gas into said primary rectification zone, means for desorbing from said rich adsorbent more readily adsorbable constituents adsorbed thereon to form a rich gas and a lean adsorbent, and means for removing the thus desorbed rich gas as a rich gas product.

22. An apparatus according to claim 21 in which means are provided for returning the primary reflux gas removed from the first side cut rectification zone to the feed gas adsorption zone.

23. An apparatus for the continuous separation of a normally gaseous mixture by selective adsorption which comprises a vertical adsorption column provided at successively lower levels therein with a cooling zone, a feed gas adsorption zone, a primary rectification zone, a first side cut rectification zone, a second side cut rectification zone, a secondary rectification zone, a desorption zone which includes a steaming zone and a heating zone, and a sealing zone, means for introducing a lean solid granular adsorbent into the top of said selective adsorption column to flow downwardly through said cooling zone to form a cooled lean adsorbent, means for introducing a first fraction of said cooled lean adsorbent into the upper part of said feed gas adsorption zone, means for introducing a second fraction of said cooled lean adsorbent directly into said first side cut rectification zone by passing independently through said feed gas adsorption and said primary rectification zones, means for passing a first fraction of enriched adsorbent formed in said primary rectification zone to said secondary rectification zone by passing independently through said first and second side cut rectification zones, means for passing a second fraction of enriched adsorbent formed in said second side cut rectification zone into said secondary rectification zone therein to combine with said first fraction of enriched adsorbent to form a combined adsorbent, means for controlling the flow rates of said first and second fractions of said adsorbent, means for combining said gaseous mixture with a primary reflux gas to form a combined feed, introducing said combined feed into said feed gas adsorption zone therein to form a rich adsorbent and a lean gas, means for removing at least a portion of said lean gas from said feed gas adsorption zone as a lean gas product containing less readily adsorbable constituents, means for removing a side cut gas containing constituents of intermediate adsorbability from said second side cut rectification zone, means for removing said primary reflux gas from said first side cut rectification zone to be combined with said gaseous mixture, means for subjecting said adsorbent in said steaming zone to a countercurrent flow of stripping steam thereby desorbing the major portion of adsorbed more readily adsorbable constituents to form a rich gas and a partially stripped adsorbent, means within said heating zone for subjecting said partially stripped adsorbent to indirect heating and to contact with further quantities of stripping steam to thereby desorb further quantities of adsorbed constituents to form a lean adsorbent, means for introducing said stripping steam into said heating zone so that a first portion thereof passes upwardly through said heating zone and a second portion passes downwardly concurrently with said lean adsorbent through said sealing zone, means for removing said second portion of said stripping steam from said sealing zone together with a portion of lean gas passing through said sealing zone countercurrently to said lean adsorbent flow therethrough, means for removing a portion of said rich gas from said steaming zone as a rich gas product while returning the remaining portion to said secondary rectification zone as reflux, means for removing a first portion of a secondary reflux gas desorbed from the adsorbent in said secondary rectification zone while returning a second portion as reflux to said second side cut rectification zone, means for returning said first portion of secondary reflux gas to said primary rectification zone, and means for conveying said lean adsorbent formed in said heating zone to the upper portion of said adsorption column so as to flow downwardly through said cooling zone.

24. An apparatus according to claim 23 wherein said means for removing said side cut gas product, said rich gas product, said primary reflux gas, and said secondary reflux gas are each provided with flow control means adapted to vary the flow rate of the particular gas in accordance with the position of a temperature break maintained within the moving bed of said adsorbent, said flow control means comprising thermocouples positioned in contact with the downwardly moving adsorbent, control instruments actuated by said thermocouples, control valves disposed within said means for removing said gases, said thermocouples, control instruments, and control valves being associated together so as to permit the variation in the flow rates of said product and reflux gases in accordance with temperature breaks present within the moving bed of said granular adsorbent.

25. In an apparatus which comprises a vertical selective adsorption column through which there is a continuous flow of a solid granular adsorbent downwardly by gravity and a countercurrent upflow of gas, the improvement which comprises adsorbent distribution means positioned in the uppermost portion of said selective adsorption column whereby the adsorbent thus introduced is distributed uniformly with respect to particle size and quantity over the entire cross sectional area of the upper portion of said selective adsorption column so as to eliminate the channeling of gas flow upwardly through the downwardly moving bed of granular adsorbent, said adsorbent distribution means consisting of movable means disposed adjacent and below said adsorbent transfer means, stationary means disposed below said movable means wherein said stationary means serve as receivers and mixers for the distributed adsorbent, means for rotating said movable means, and means for conducting a gas flow upwardly through and independent of the adsorbent present in said adsorbent distribution means.

26. In an apparatus for the continuous separation of a normally gaseous mixture containing constituents of differing degrees of adsorbability which comprises a vertical selective adsorption column provided at successively lower levels therein with a cooling zone, feed gas adsorption zone, a primary rectification zone, at least one side cut gas rectification zone, a secondary rectification zone, and a desorption zone, means for maintaining a continuous flow of a solid granular adsorbent downwardly by gravity through said selective adsorption column, and adsorbent transfer means for introducing adsorbent into the uppermost portion of said adsorption column, the improvement which comprises adsorbent distribution means positioned in the uppermost portion of said selective adsorption column above said cooling zone and below said adsorbent transfer means whereby the adsorbent thus introduced is distributed uniformly with respect to particle size and quantity over the entire cross sectional area of the upper portion of said selective adsorption column so as to eliminate the channeling of gas flow upwardly through the downwardly moving bed of granular adsorbent, said adsorbent distribution means consisting of movable means disposed adjacent and below said adsorbent transfer means, stationary means disposed below said movable means wherein said stationary means serve as receivers and mixers for the distributed adsorbent, means for rotating said movable means, and means for conducting a lean drying gas flow upwardly through and independent of the adsorbent present in said adsorbent distribution means.

27. In the process for the continuous separation of normally gaseous mixtures by selective adsorption on a solid granular adsorbent wherein the gaseous mixture to be separated is introduced into a feed gas zone wherein it is contacted with a moving bed of said adsorbent thereby adsorbing more readily adsorbable constituents of said gaseous mixture to form a rich adsorbent and a lean gas containing less readily adsorbable constituents, removing said lean gas from said feed gas zone as a lean gas product, subsequently passing said rich adsorbent into a steaming zone wherein a first portion of said more readily adsorbable constituents adsorbed thereon are desorbed by contact with stripping steam in absence of indirect heating to form a rich gas and a partially stripped adsorbent, passing said partially stripped adsorbent from said steaming zone into a heating zone wherein said adsorbent is subjected to indirect heating and contacted by further quantities of stripping steam so as to substantially completely remove the adsorbed more readily adsorbable constituents to form a lean adsorbent, the improvement which comprises controlling the flow rate at which stripping steam is introduced into said heating zone in accordance with the position of a temperature break which is present in the moving bed of said adsorbent passing downwardly through said stripping zone.

28. In a process for the separation of a gaseous mixture by selective adsorption on a solid adsorbent wherein said gaseous mixture is contacted with said adsorbent so as to adsorb a rich gas fraction thereon and leave unadsorbed a lean gas fraction which is withdrawn, and the adsorbed rich gas is desorbed from the enriched adsorbent with the aid of heat and a stripping gas, the improvement which comprises desorbing said rich gas by passing said enriched adsorbent successively through a steaming zone and an indirect heating zone, passing a stream of said stripping gas in countercurrent contact therewith, and maintaining a substantial internal recycle of stripping gas by maintaining a temperature in said steaming zone sufficiently low to cause preferential adsorption of a portion of said stripping gas with displacement of the major proportion of said rich gas therein, and maintaining a temperature in said heating zone sufficiently high to desorb substantially all of said adsorbed stripping gas.

29. In a process for the continuous separation of a gaseous mixture by selective adsorption and desorption wherein a solid adsorbent is continuously recirculated through successive zones of adsorption, desorption, and cooling respectively, the improvement which comprises stripping the adsorbed gases from the enriched adsorbent by passing the enriched adsorbent successively through a steaming zone and a heating zone, passing steam into said heating zone so as to pass through said steaming and heating zones in countercurrent contact with said adsorbent, maintaining a temperature in said steaming zone at a value of at least about 200° F. lower than T°F. as defined by the equation $$T°F. = 175 P^{0.191}$$

wherein P is the operation pressure in pounds per square inch absolute, maintaining a maximum temperature in said heating zone at a value greater than T°F. as defined by the above equation, and withdrawing desorbed gases from said steaming zone.

30. In a process for the separation of gaseous mixtures by selective adsorption and desorption wherein a solid adsorbent is continuously recirculated successively through an adsorption zone in which a portion of said gaseous mixture is adsorbed thereon, a desorption zone in which the adsorbed gases are removed by heating the adsorbent in the presence of added steam, a sealing zone, and a cooling zone, respectively, and unadsorbed lean gas is withdrawn from the adsorption zone, and rich gas is withdrawn from the desorption zone, the improvement which comprises removing unadsorbed steam passing concurrently with the adsorbent through said sealing zone by contacting said adsorbent prior to transfer of the adsorbent to the cooling zone with a stream of the said lean gas, and withdrawing the resulting mixture of steam and lean gas from the system.

CLYDE H. O. BERG.

REFERENCES CITED

The following references are of record in the file of this patent:

UNITED STATES PATENTS

| Number | Name | Date |
| --- | --- | --- |
| 1,422,007 | Soddy | July 4, 1922 |
| 1,836,301 | Bechthold | Dec. 15, 1931 |
| 2,252,550 | Bragg | Aug. 12, 1941 |
| 2,259,963 | Surico | Oct. 21, 1941 |
| 2,351,214 | Kaufmann et al. | June 13, 1944 |
| 2,384,311 | Kearby | Sept. 4, 1945 |
| 2,434,202 | Evans | Jan. 6, 1948 |